(12) United States Patent
Rakshit et al.

(10) Patent No.: US 12,134,232 B2
(45) Date of Patent: Nov. 5, 2024

(54) SYSTEM AND METHOD FOR CREATING AN OBJECT USING ADDITIVE MANUFACTURING

(71) Applicant: International Business Machines Corporation, Armonk, NY (US)

(72) Inventors: Sarbajit K. Rakshit, Kolkata (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/081,272

(22) Filed: Dec. 14, 2022

(65) Prior Publication Data
US 2024/0198599 A1    Jun. 20, 2024

(51) Int. Cl.
| | |
|---|---|
| *B29C 64/393* | (2017.01) |
| *B29C 64/245* | (2017.01) |
| *B33Y 10/00* | (2015.01) |
| *B33Y 50/02* | (2015.01) |
| *B33Y 30/00* | (2015.01) |

(52) U.S. Cl.
CPC .......... *B29C 64/393* (2017.08); *B29C 64/245* (2017.08); *B33Y 10/00* (2014.12); *B33Y 30/00* (2014.12); *B33Y 50/02* (2014.12)

(58) Field of Classification Search
CPC ...................................................... B28B 1/001
See application file for complete search history.

(56) References Cited

U.S. PATENT DOCUMENTS

| | | | |
|---|---|---|---|
| 10,933,623 B2 | 3/2021 | Baecher et al. | |
| 2018/0370117 A1* | 12/2018 | Gardiner | B33Y 30/00 |
| 2019/0036337 A1* | 1/2019 | Zhang | B29C 64/227 |
| 2021/0276269 A1* | 9/2021 | Rakshit | G06N 20/00 |
| 2022/0241975 A1 | 8/2022 | Tan et al. | |

FOREIGN PATENT DOCUMENTS

| | | | | |
|---|---|---|---|---|
| WO | WO-2021212068 A1 * | 10/2021 | ............. | B28B 1/001 |
| WO | WO-2021249659 A1 * | 12/2021 | ........... | B29C 64/379 |

OTHER PUBLICATIONS

Anonymous, "Two Problem Solving Insights To Prevent Deformation While Large Scale 3D Printing," Cead [online], Jun. 7, 2021 [accessed on Nov. 7, 2023], 4 pages, Retrieved from the Internet: <URL: https://ceadgroup.com/two-problem-solving-insights-to-prevent-deformation-while-large-scale-3d-printing/>.

Daly, "How space exploration is now being fueled by business innovation," IBM Blog [online], Oct. 27, 2020 [accessed on Nov. 7, 2023], 12 pages, Retrieved from the Internet: <URL: https://www.ibm.com/blog/IBM-space-tech-business-innovation-space-exploration/>.

(Continued)

*Primary Examiner* — Seyed Masoud Malekzadeh
*Assistant Examiner* — Vipul Malik
(74) *Attorney, Agent, or Firm* — Robert D. Bean

(57) ABSTRACT

A system for 3D printing can include a printing device configured to create an object by depositing successive layers of uncured material and at least one mitigating device. At least one of the printing device and the at least one mitigating device can be configured to perform a method to mitigate a deformation of at least one of the successive layers of uncured material.

5 Claims, 13 Drawing Sheets

(56) References Cited

OTHER PUBLICATIONS

Housing News Desk, "3d Printed House Designs, Ideas in 2024," Housing [online], Oct. 16, 2023 [accessed on Nov. 7, 2023], 11 pages, Retrieved from the Internet: <URL: https://housing.com/news/first-3d-printed-house-india/>.

Patra, "World's first 3D-printed steel bridge opens to public in Amsterdam," The Hindu [online], Jul. 22, 2021 [accessed on Nov. 7, 2023], 5 pages, Retrieved from the Internet: <URL: https://www.thehindu.com/sci-tech/technology/worlds-first-3d-printed-steel-bridge-opens-to-public-in-amsterdam/article35462853.ece>.

Thomas, "Hybrid 3D Printing and Its Applications in Wind Energy," AZO Cleantech [editorial feature], Jan. 3, 2019 [accessed on Nov. 7, 2023], 4 pages, Retrieved from the Internet: <URL: https://www.azocleantech.com/article.aspx?ArticleID=832>.

Anonymous. (Aug. 4, 2021) "Method and System for 3D Printing with Dynamic Insulation for Controlled Solidification" <https://priorart.ip.com/IPCOM/000266641>.

\* cited by examiner

SYSTEM AND METHOD FOR CREATING AN OBJECT USING ADDITIVE MANUFACTURING

FIELD OF THE DISCLOSURE

Embodiments of the present invention relate generally to systems and methods for three-dimensional printing, and more specifically avoiding deformation while three-dimensional printing in open areas.

BACKGROUND

Three-dimensional (3D) printing is a type of additive manufacturing that can be used to make 3D objects by adding material, such as by depositing successive layers. 3D printing can enable the creation of complex shapes using less material than traditional manufacturing methods.

In some processes, successive layers of an uncured, melted, or semi-melted material, such as a thermoplastic or concrete fuse to layers above, below, or both above and below, and solidify to form a hardened object. However, environmental factors can interfere with the deposition process and the solidification process. For example, if wind blows a 3D printer off its course, there may not be sufficient overlap between layers to allow for the fusion thereof. Wind can also deform a layer that is deposited but not yet solidified.

Printing support structures that may or may not be removed following printing can be used to avoid deformation from environmental factors but are increasingly impractical and wasteful as the size of the object to be printed increases.

The present disclosure is directed to overcoming these and other problems of the prior art.

SUMMARY

The present disclosure relates to systems and methods for 3D printing. More specifically, aspects of the present disclosure relate avoiding deformation while three-dimensional printing in open areas. In an exemplary embodiment of the present disclosure, there is provided a system for 3D printing. The system can include a printing device configured to create an object by depositing successive layers of uncured material and at least one mitigating device. At least one of the printing device and the at least one mitigating device can be configured to perform a method to mitigate a deformation of at least one of the successive layers of uncured material.

In some embodiments, the at least one mitigating device can include at least one supporting device configured to perform a method to mitigate a deformation including physically supporting at least one of the successive layers of uncured material.

In any of the embodiments disclosed herein, the at least one mitigating device can include a plurality of devices forming a device swarm, wherein at least one of the plurality of devices of the device swarm is configured to physically couple with at least one other of the plurality of devices of the device swarm to stabilize the device swarm.

In any of the embodiments disclosed herein, the system can further include a processor configured to receive a location of the object and receive environmental information about the location, the environmental information can include a wind direction and a wind speed of a wind, and the method to mitigate the deformation is based at least in part on the received environmental information.

In any of the embodiments disclosed herein, the processor can be further configured to determine that the wind speed exceeds a threshold, and at least one mitigating device can be configured to perform the method to mitigate the deformation, the method to mitigate the deformation including physically supporting at least one of the successive layers of uncured material and shielding the at least one of the successive layers of uncured material from the wind when the wind speed exceeds the threshold. At least one mitigating device can include a supporting device configured to perform the method to mitigate the deformation by physically supporting at least one of the successive layers of uncured material and a shielding device configured to perform the method to mitigate the deformation by shielding the at least one of the successive layers of uncured material from the wind when the wind speed exceeds the threshold.

In any of the embodiments disclosed herein, the processor can be further configured to determine that at least one of the successive layers of uncured material could be deformed by the wind, and at least one mitigating device can be configured to perform the method to mitigate the deformation including shielding the at least one of the successive layers of uncured material that could be deformed from the wind.

In any of the embodiments disclosed herein, determining the at least one of the successive layers of uncured material that could be deformed can include receiving a plurality of printing parameters including a type of the uncured material and a speed of printing, determining a time required to solidify at least one of the successive layers of uncured material based at least in part on the type of the uncured material and the speed of printing, and determining that the time required to solidify is above a threshold such that at least one of the successive layers of uncured material that could be deformed by the wind based at least in part on the environmental information.

In any of the embodiments disclosed herein, the mitigating device can have a first end and a second end, the first end being connected to at least one of the successive layers of uncured material and the second end being connected to a solidified layer of the object.

In any of the embodiments disclosed herein, the processor can be further configured to receive a plurality of printing parameters including a type of the uncured material and a speed of printing, determine a time required to solidify at least one of the successive layers of uncured material based at least in part on the type of the uncured material and the speed of printing, and determine at least one of the successive layers of uncured material that could be deformed by the wind based at least in part on the environmental information. The printing device can be configured to perform the method to mitigate the deformation including changing the speed of printing in response to the determination that at least one of the successive layers of uncured material that could be deformed by the wind based at least in part on the environmental information.

In any of the embodiments disclosed herein, the processor can be further configured to receive captured object information and determine a difference between the captured object information to an intended object design. The captured object information can include one or more of: a geometry of the object, a surface texture of the object, a layer height of the object, a degree of solidification of the material, and a temperature-dependent solidification rate of the material, and the method to mitigate the deformation can include changing a path of printing in response to the difference.

In an exemplary embodiment of the present disclosure, there is provided a method of creating an object while preventing deformation. The method can include depositing successive layers of uncured material and mitigating a deformation of at least one of successive layers of uncured material.

In any of the embodiments disclosed herein, mitigating the deformation can include physically supporting at least one of the successive layers of uncured material with at least one of a plurality of devices.

In any of the embodiments disclosed herein, the method can further include physically coupling at least one of the plurality of devices with at least one other of the plurality of devices to stabilize the plurality of devices.

In any of the embodiments disclosed herein, the method can further include receiving a location of the object and receiving environmental information about the location. The environmental information can include a wind direction and a wind speed of a wind, and mitigating the deformation can be based at least in part on the received environmental information.

In any of the embodiments disclosed herein, the method can further include determining that the wind speed exceeds a threshold, and mitigating the deformation can include physically supporting at least one of the successive layers of uncured material and shielding the at least one of the successive layers of uncured material from the wind when the wind speed exceeds the threshold with at least one of a plurality of devices.

In any of the embodiments disclosed herein, the method can further include determining that at least one of the successive layers of uncured material could be deformed by the wind by: receiving a plurality of printing parameters, namely a type of the uncured material and a speed of printing, determining a time required to solidify at least one of the successive layers of uncured material based at least in part on the type of the uncured material and the speed of printing, and determining that the time required to solidify is above a threshold such that at least one of the successive layers of uncured material that could be deformed by the wind based at least in part on the environmental information, and shielding the at least one of the successive layers of uncured material that could be deformed from the wind.

In any of the embodiments disclosed herein, the method can further include receiving a plurality of printing parameters, determining a time required to solidify at least one of the successive layers of uncured material based at least in part on the type of the uncured material and the speed of printing, and determining at least one of the successive layers of uncured material that could be deformed by the wind based at least in part on the environmental information. Mitigating the deformation can include changing the speed of printing in response to the determination that at least one of the successive layers of uncured material that could be deformed by the wind based at least in part on the environmental information.

In an exemplary embodiment of the present disclosure, there is provided a computer program product configured to perform a mitigation prevention process. The computer program product can include a computer readable storage medium having program instructions embodied therewith, the program instructions executable by a processor to cause the processor to: simulate a deformation of an object based on environmental information, determine a time required to solidify at least one successive layer of uncured material based at least in part on the type of the uncured material and the speed of printing, determine at least one of the successive layers of uncured material that could be deformed by a wind based at least in part on environmental information, control a printing device to deposit the at least one successive layer of uncured material according to the simulated deformation and the at least one successive layer that could be deformed, and control at least one of the printing device or at least one mitigating device to mitigate a deformation of the at least one of the successive layer of uncured material.

In any of the embodiments disclosed herein, the simulating deformation of the object can include receiving the environmental information and executing a computer simulation of deformation of the object using at least the environmental information and the time as inputs.

In any of the embodiments disclosed herein, the controlling at least one of the printing device or the at least one mitigating device to mitigate the deformation can include physically supporting the at least one of the successive layers of uncured material that could be deformed and shielding the at least one of the successive layers of uncured material that could be deformed.

This summary is provided to introduce a selection of concepts in a simplified form that are further described below in the detailed description. This summary is not intended to identify key features or essential features of the claimed subject matter, nor is it intended to be used to limit the scope of the claimed subject matter. Additional features and advantages of the disclosed technology will be made apparent from the following detailed description of illustrative embodiments that proceeds with reference to the accompanying drawings.

BRIEF DESCRIPTION OF THE DRAWINGS

The following detailed description of specific embodiments of the disclosure will be better understood when read in conjunction with the appended drawings. For the purpose of illustrating the disclosure, specific embodiments are shown in the drawings. It should be understood, however, that the disclosure is not limited to the precise arrangements and instrumentalities of the embodiments shown in the drawings.

DETAILED DESCRIPTION

Figure 1:
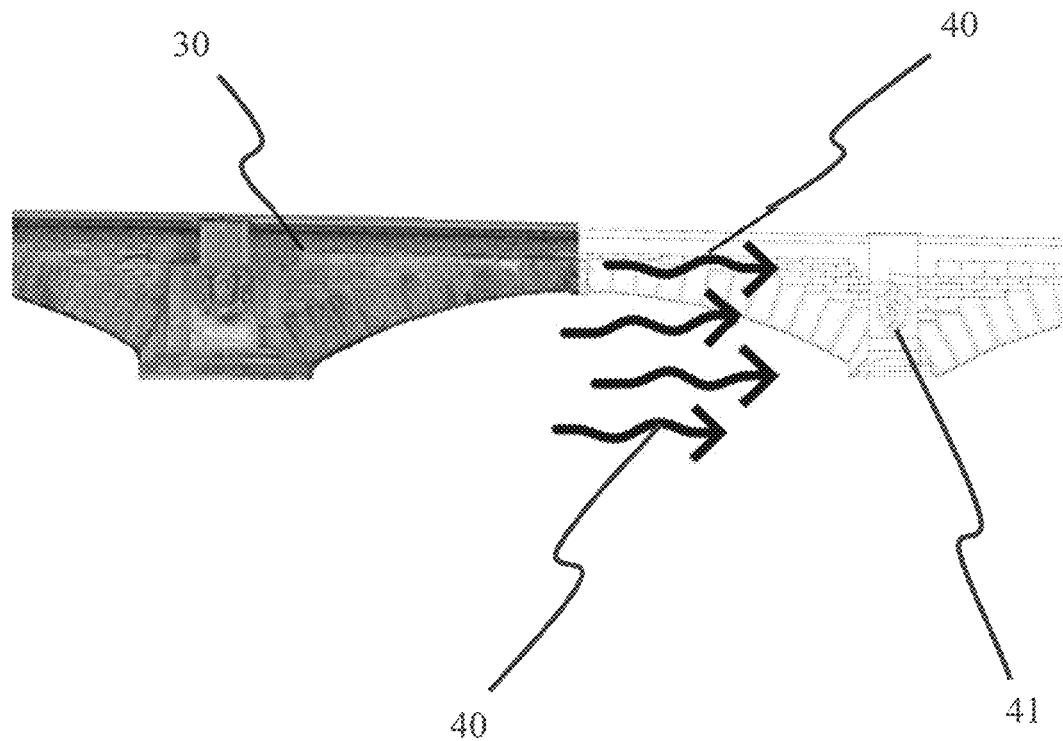
FIG. 1 illustrates an embodiment of a design for creating an object using additive manufacturing, in accordance with an embodiment of the present disclosure.

To facilitate an understanding of the principles and features of the various embodiments of the disclosure, various illustrative embodiments are explained below. Although exemplary embodiments of the disclosure are explained in detail, it is to be understood that other embodiments are contemplated. Accordingly, it is not intended that the disclosure is limited in its scope to the details of construction and arrangement of components set forth in the following description or examples. The disclosure is capable of other embodiments and of being practiced or carried out in various ways. Also, in describing the exemplary embodiments, specific terminology will be resorted to for the sake of clarity.

Although certain examples of the disclosed technology are explained in detail, it is to be understood that other examples, embodiments, and implementations of the disclosed technology are contemplated. Accordingly, it is not intended that the disclosed technology is limited in its scope to the details of construction and arrangement of components set forth in the following description or illustrated in the drawings. The disclosed technology can be implemented in a variety of examples and can be practiced or carried out in various ways. In particular, the presently disclosed subject matter is described in the context of 3D printing an object. The present disclosure, however, is not so limited, and can be applicable to other applications. The present disclosure, for example and not limitation, can include forming an object by any form of additive manufacturing that involves depositing uncured material. Such implementations and applications are contemplated within the scope of the present disclosure. Accordingly, when the present disclosure is described in the context of 3D printing an object, it will be understood that other implementations can take the place of those referred to.

Additive manufacturing, including 3D printing in particular, can be useful for producing structures, including large structures like windmills. For example, using 3D printing to create a structure can allow the structure to be created at its location of use, thereby avoiding the need to transport the structures from its location of manufacture to its location of use and the associated expense and labor. However, certain challenges exist in creating structures via 3D printing. For example, environmental conditions at the location of use, such as wind, can cause deformation of the object during 3D printing. For example, the wind can blow a 3D printer off its course or deform a layer that is deposited but not yet solidified. Deformation can be undesirable for several reasons: it can negatively affect the structural integrity and the aesthetic of the structure.

To overcome these and other problems in the prior art, the present disclosure provides systems and methods for creating an object using additive manufacturing. In an embodiment, multiple robots (together, a "swarm") can work together to 3D create an object with minimal or no deformation. For example, in an embodiment, a system can include a printing device to create the object and at least one mitigating device to avoid deformation of the created object. In some embodiments, a mitigating device may be a device to shield the created device from wind or to physically support the device. In some embodiments, the printing device can also operate as a mitigating device by adjusting the printing parameters to avoid or minimize deformation of the created object.

As used herein, the term "create" in relation to an object can also mean "repair". For example, creating a wind turbine tower and repairing a damaged existing wind turbine tower can be thought of as both being within the scope of creating a wind turbine tower.

FIG. 1 illustrates an embodiment of a design for creating an object using additive manufacturing, in accordance with an embodiment of the present disclosure. As illustrated in FIG. 1, additive manufacturing, including, for example, 3D printing, can be used to create objects. The object 30 in FIG. 1 is a bridge, and the depositing successive layers of uncured materials can occur on top of an existing object such as the bridge of FIG. 1 in order to repair the object 30 or alternatively on top of native terrain in order to create an entirely new object 30. In the embodiment of FIG. 1, the bridge has two parts: one solidified part 30 and one part to be created using 3D printing 41. However, wind 40 at the location of printing can cause deformation to the creating of the part of the bridge to be created using 3D printing 41. For example, wind 40 deformation to newly laid and uncured layers of material or it could blow the 3D printer off its course causing insufficient overlap between layers to allow for the fusion thereof.

Figure 2:
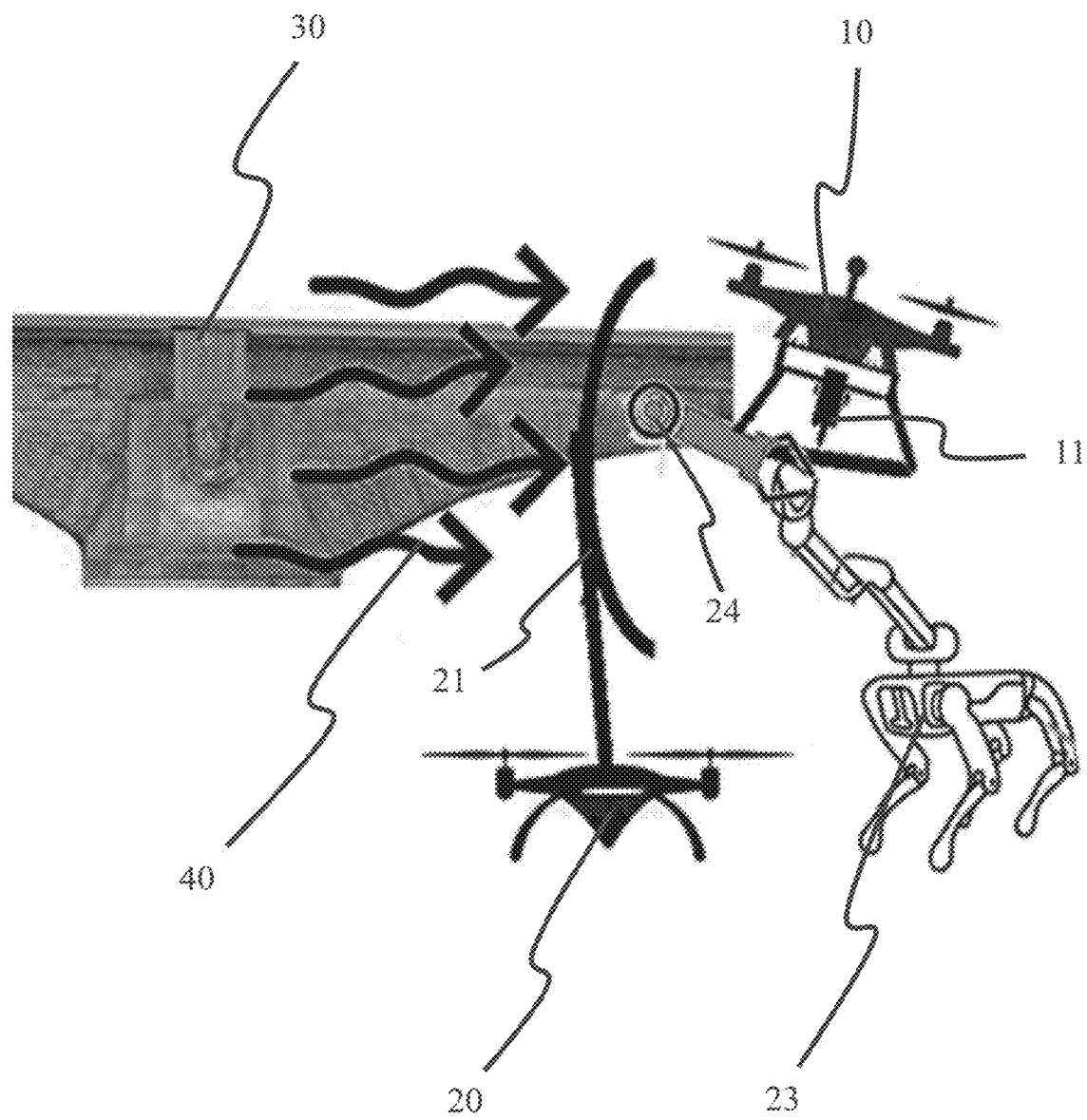
FIG. 2 illustrates an embodiment of a system for creating an object using additive manufacturing, in accordance with an embodiment of the present disclosure.

FIG. 2 illustrates an embodiment of a system for creating an object using additive manufacturing, in accordance with an embodiment of the present disclosure. As shown in FIG. 2, a system for creating an object using additive manufacturing can comprise a printing device 10, a shielding device 20, and a supporting device 23. In an embodiment, the printing device 10 can create an object, e.g., a part of a bridge to be created using 3D printing 41, by depositing successive layers of uncured material. One or more mitigating devices, which can include a shielding device 20, a supporting device 23, or both, can be used to avoid deformation of the created object.

Figure 3:
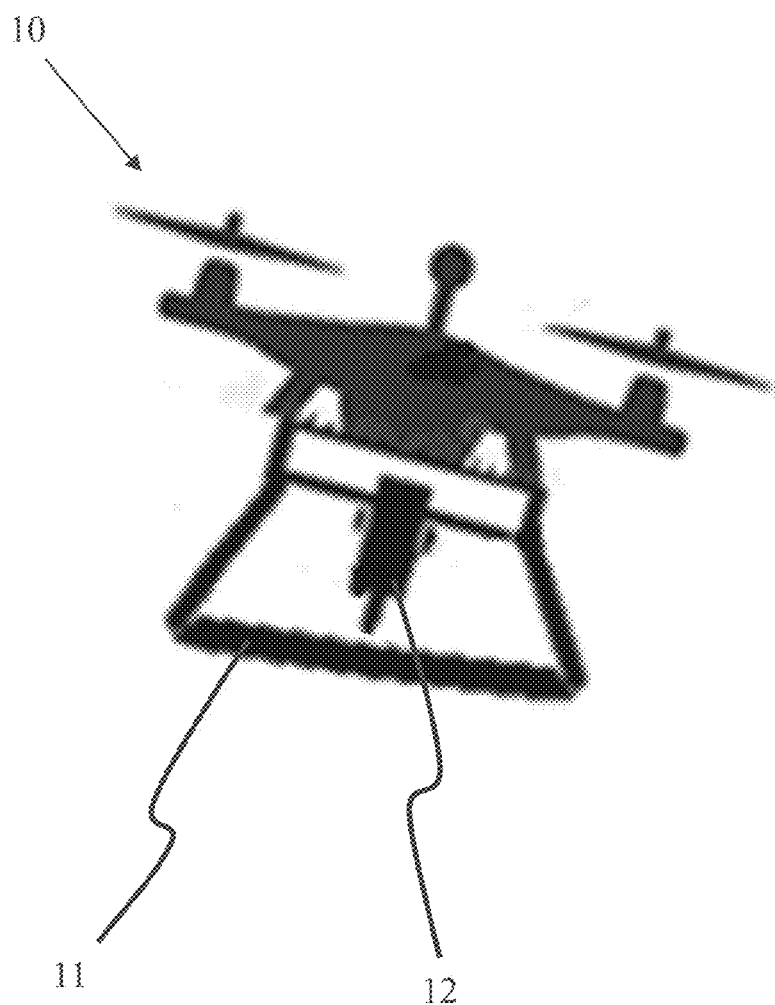
FIG. 3 illustrates an exemplary printing device 10, in accordance with an embodiment of the present disclosure.
Figure 4:
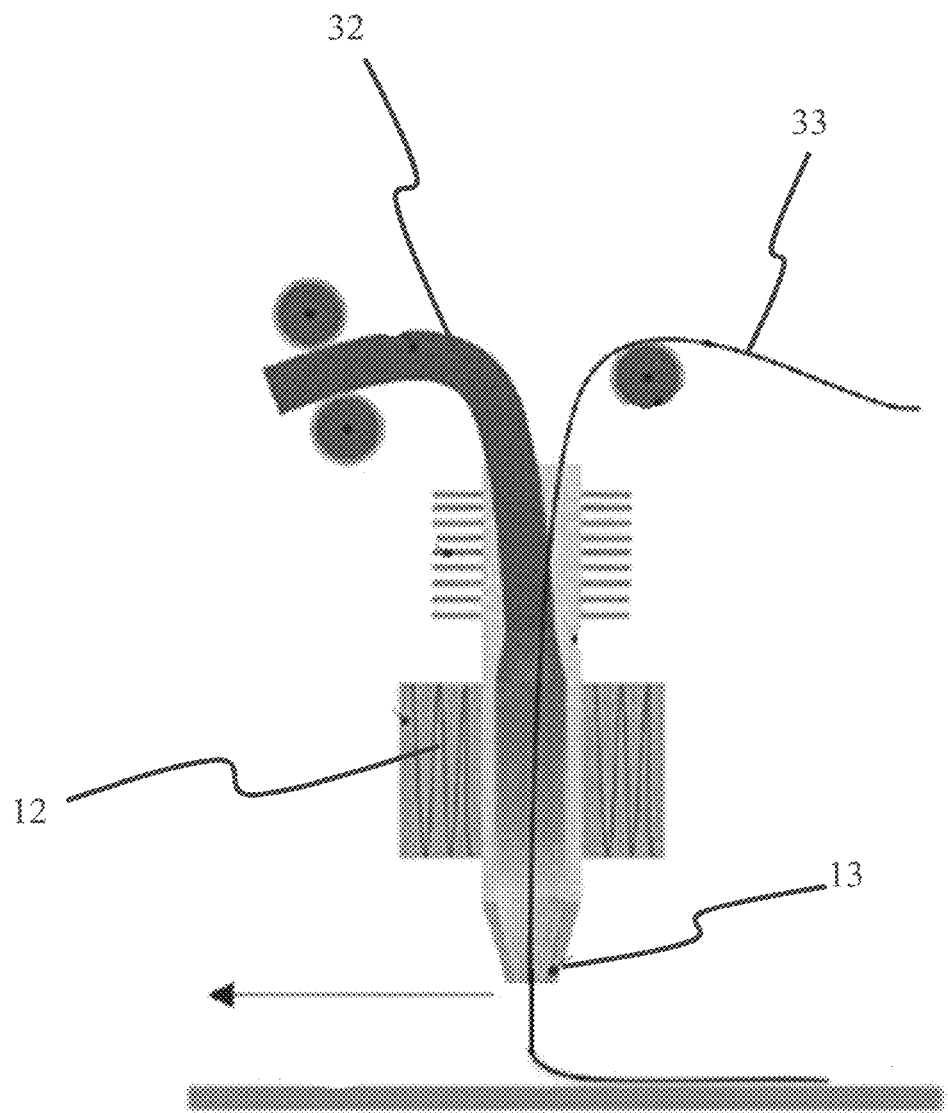
FIG. 4 illustrates an embodiment of a 3D printing apparatus, in accordance with an embodiment of the present disclosure.

FIG. 3 illustrates an embodiment of a printing device 10, in accordance with an embodiment of the present disclosure. In some embodiments, the printing device 10 can be a device configured to deposit successive layers of uncured material to create an object. In some embodiments, the printing device can include a 3D printing apparatus, as illustrated in FIG. 4 through which uncured material is extruded through a nozzle 12. In some embodiments, the printing device 10 can be configured to fly or hover in the air. In some embodiments, the printing device 10 can include wheels or tracks to travel on the ground, a deposited layer of material, or a solidified portion of the object 30.

Figure 5:
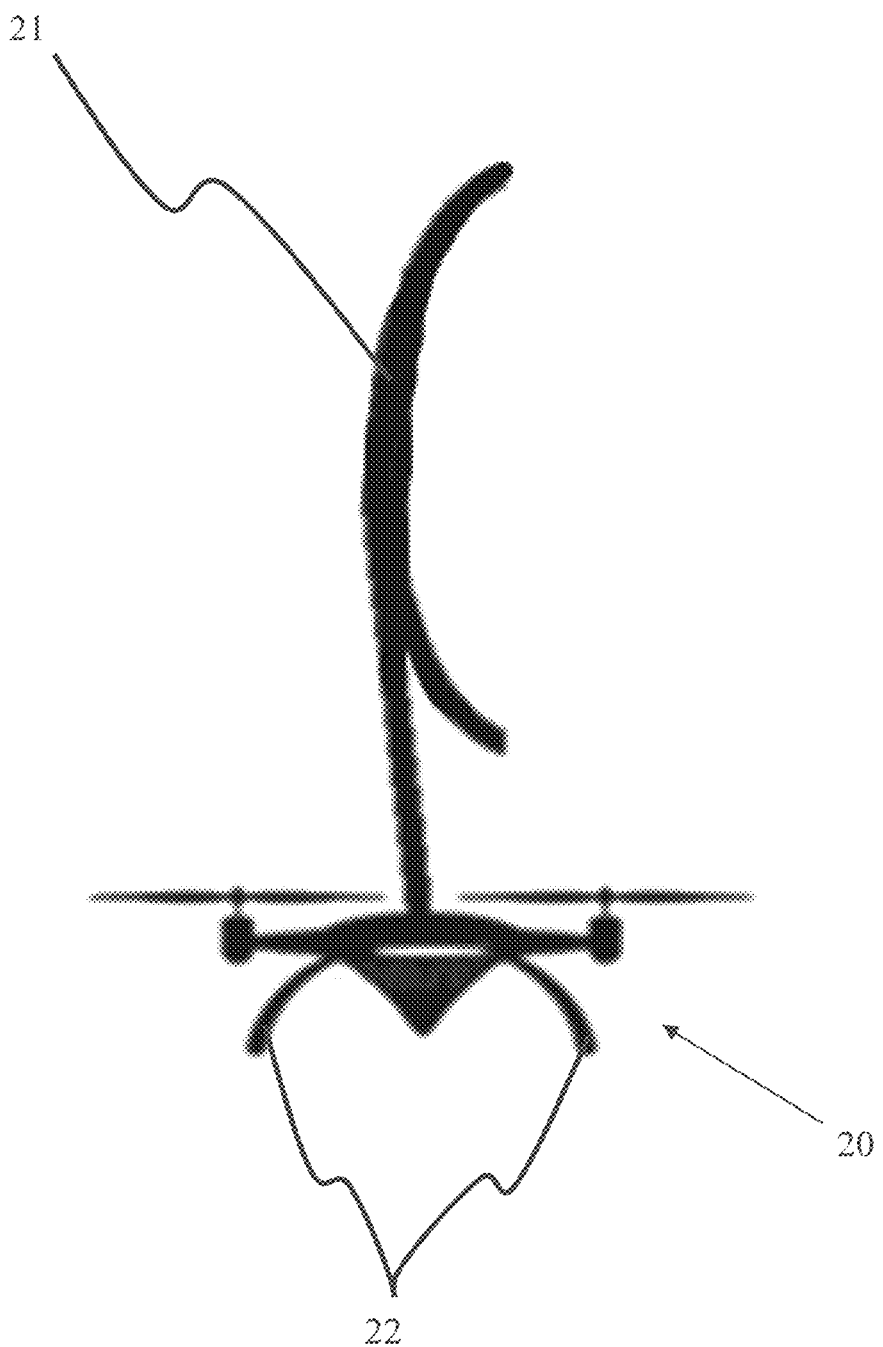
FIG. 5 illustrates an embodiment of a shielding device 20, in accordance with an embodiment of the present disclosure.

FIG. 5 illustrates an embodiment of a shielding device 20, in accordance with an embodiment of the present disclosure. In some embodiments, the shielding device 20 can be a device configured to shield the material with a shield 21 from environmental conditions, like the wind, which can deform material or blow a printing device 10 off course. For example, in some embodiments, the shielding device 20 can protect the uncured material or the printing device 10 from the wind by positioning the shield 21 between the object and the direction of the wind, as illustrated in FIG. 2. In some embodiments, the shielding device 20 can be configured to fly or hover in the air. In some embodiments, the shielding device 20 can comprise one or more legs 22 that can be configured to couple with one or more legs of another device, for example, another shielding device. Legs 22 can be helpful in embodiments where the system includes multiple devices to form a "device swarm." In such embodiments, one or more the devices can physically couple to one another, for example, using one or more legs 22, to stabilize the device swarm.

Figure 6:
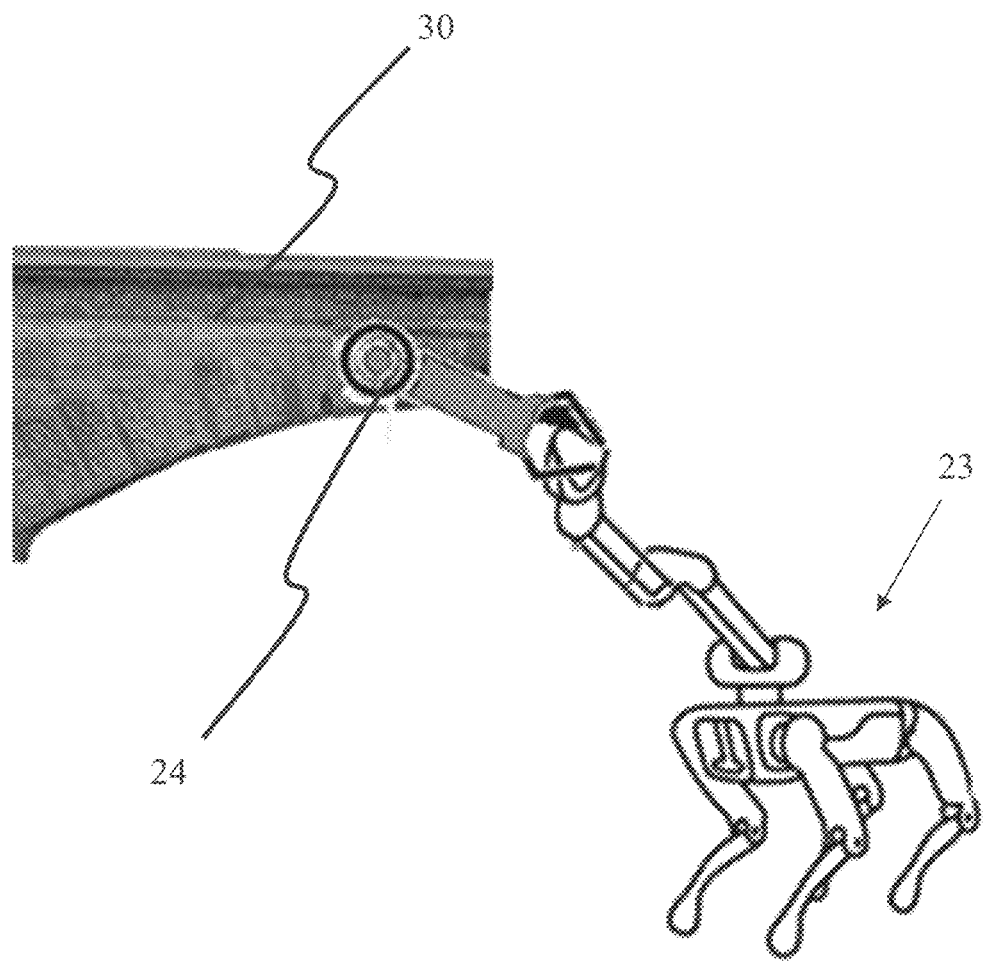
FIG. 6 illustrates an embodiment of a supporting device 23, in accordance with an embodiment of the present disclosure.

FIG. 6 illustrates an embodiment of a supporting device 23, in accordance with an embodiment of the present disclosure. In some embodiments, a supporting device 23 can be a device configured to provide physical support to material. In some embodiments, the supporting device 23 can comprise a supporting arm 24 that can connect to the material. Physically supporting the material 32 can minimize an amount of supporting material required for creation of the object. Providing physical support that can move from place to place can minimize or eliminate the need to print supporting material that is only needed to support the object during solidification and not for the final object. The supporting device 23 can be supported by a stable body. For example, the supporting device 23 can be supported by the ground, terrain, a solidified layer or layers of the object 30, or any other stable body.

Figure 7:
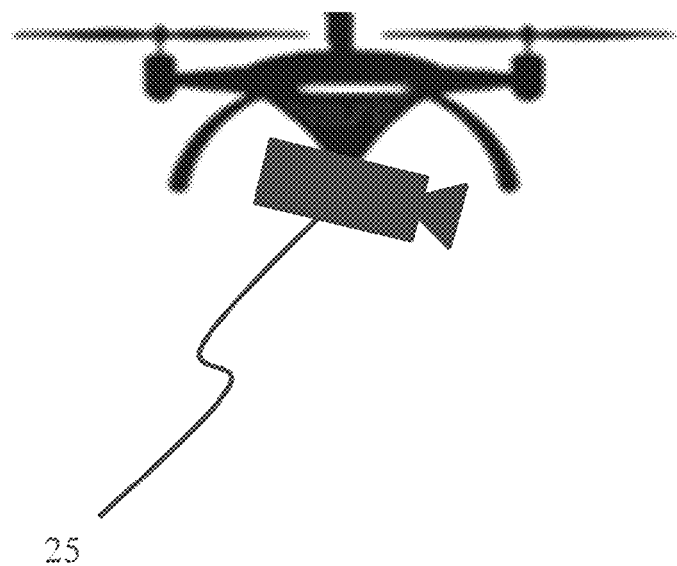
FIG. 7 illustrates an embodiment of a recording device 25, in accordance with an embodiment of the present disclosure.

FIG. 7 illustrates an embodiment of a recording device 25, in accordance with an embodiment of the present disclosure. In some embodiments, a recording device can be a device 25 configured to capture object information with, for example, a camera or an infrared sensor or any other similar device that can assist in semi-autonomous and autonomous operations. In some examples, the recording device 25 can capture object information that can be used to determine a difference between the captured object information to an intended object design. In some embodiments, the captured object information can include a geometry of the object 30, a surface texture of the object 30, a layer height of the object 30, a degree of solidification of the material 32, and a temperature-dependent solidification rate of the material 32. In some embodiments, the recording device 25 can be configured to fly or hover in the air.

Returning to FIG. 1, in an embodiment, the system can include a shielding device 20 that can protect the printing device 10, the material 32, or both from the wind 40 by positioning its shield 21 between the direction of the wind 40 and the printing device 10, the uncured material, or both, as applicable. Additionally or alternatively, the system can include a supporting device 23 that can provide physical support to the material 32. Although a printing device 10, a shielding device 20, and a supporting device 23 are shown in FIG. 1, the systems and methods described herein are not so limited. Instead, a system may include only one, all three, or any two of those devices. Further, the system may include multiple of the same device.

For example, in some embodiments, what devices are included can be based on the environmental conditions and the printing parameters. In some embodiments, environmental conditions can include wind and gravity. In some embodiments, printing parameters can include layer width, layer height, extrusion rate, and extrusion temperature.

In some embodiments, the devices included as part of the system can be based on the environmental conditions at the location of printing, the printing parameters, or both. For example, if there is no wind at the location of printing, the system may not include a shielding device 20. For another example, if the part to be created using 3D printing 41 will likely deform due to the effects of gravity without a physical support, the system may include a supporting device 23. However, as one or ordinary skill in the art will appreciate, and as is further explained below, other combinations are possible.

Figure 8:
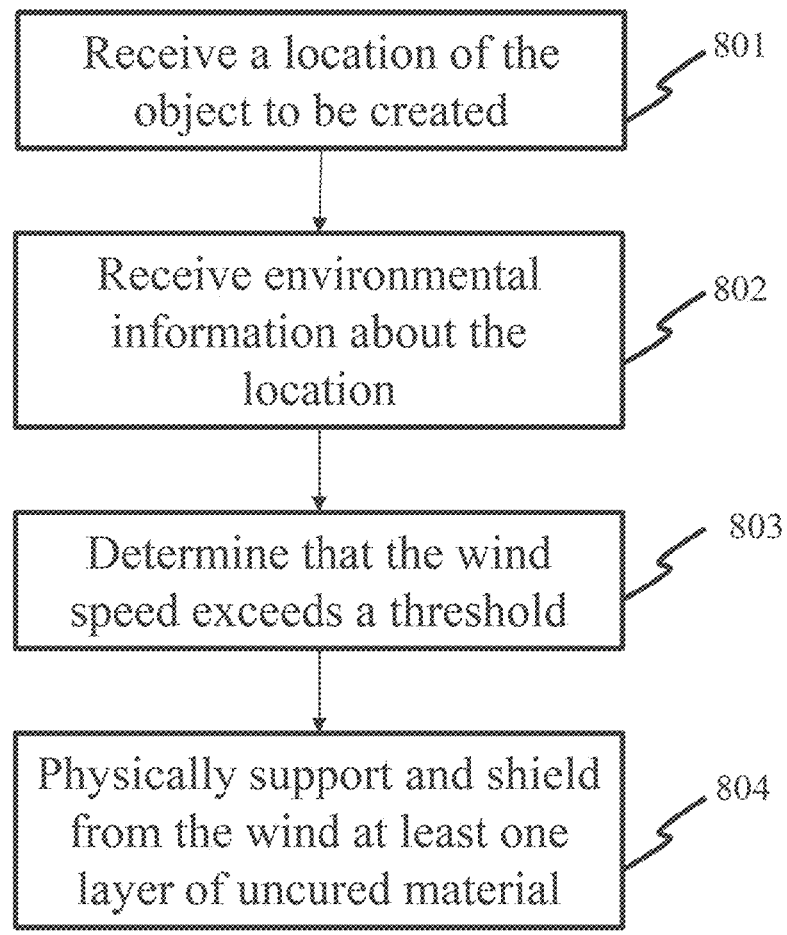
FIG. 8 is a flowchart of an embodiment of a method of creating an object using additive manufacturing, in accordance with an embodiment of the disclosure.

FIG. 8 is a flowchart of an embodiment of a method of creating an object using additive manufacturing, in accordance with an embodiment of the disclosure. As shown in FIG. 8, a method of creating an object using additive manufacturing can include, at step 801, receiving a location of an object to be created. At step 802, the method can include receiving environmental information at the location. In some embodiments, the environmental information can include a wind direction and a wind speed. At step 803, the method can include determining that the wind speed exceeds a threshold. In some examples, the threshold can be set based on the exposed area of a portion of the material 32, a speed of the wind 40, and material properties of the material 32 such that when the speed of the wind 40 meets or exceeds the threshold, the material 32 will deform by more than a certain proportion, for example about 3%. The wind speed threshold can for example be as low as about 1 mile per hour and in some other examples can be as high as about 50 miles per hour. At step 804, the method can include physically supporting and shielding the object to be created from the wind. In some embodiments, the supporting device 23 can provide the physical support and the shielding device 20 can shield the object from the wind 40.

Figure 9:
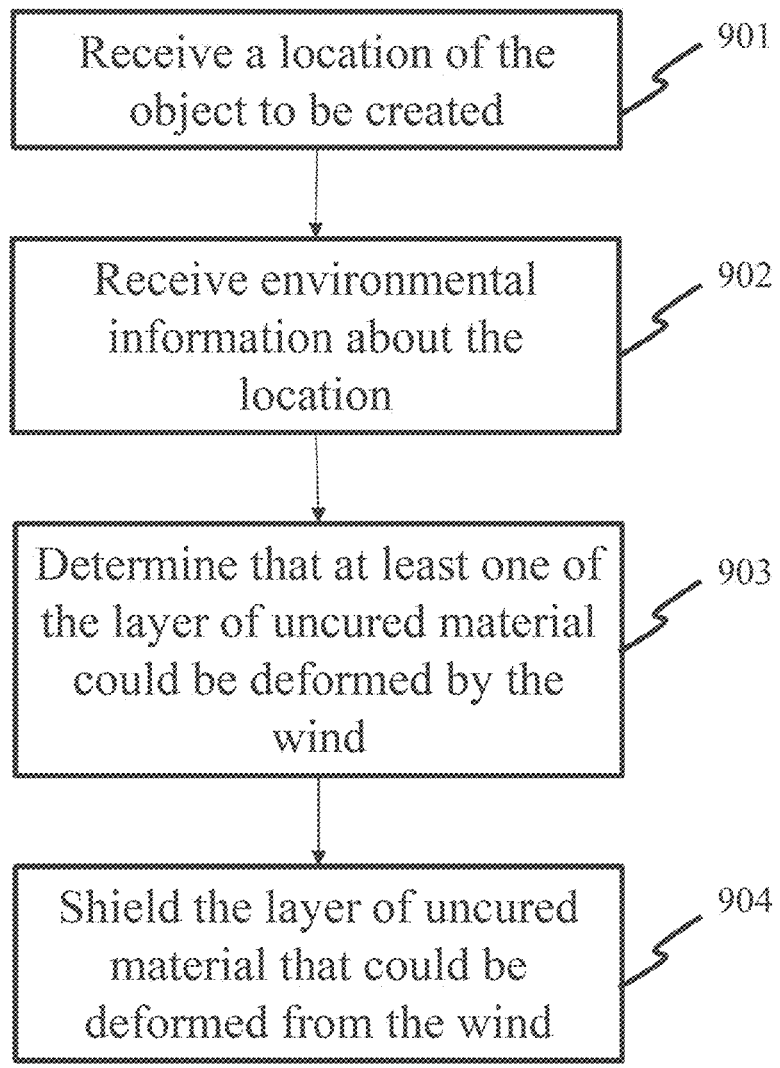
FIG. 9 is a flowchart of an embodiment of a method of creating an object using additive manufacturing, in accordance with an embodiment of the disclosure.

FIG. 9 is a flowchart of an embodiment of a method of creating an object using additive manufacturing, in accordance with an embodiment of the disclosure. As shown in FIG. 9, a method of creating an object using additive manufacturing can include, at step 901, receiving a location of an object to be created. At step 902, the method can include receiving environmental information at the location. At step 903, the method can include determining that at least one layer of material could be deformed by the wind. At step 904, the method can include shielding the layer that could be deformed. In some embodiments, the shielding device 20 can shield the layer that could be deformed from the wind 40.

Figure 10:
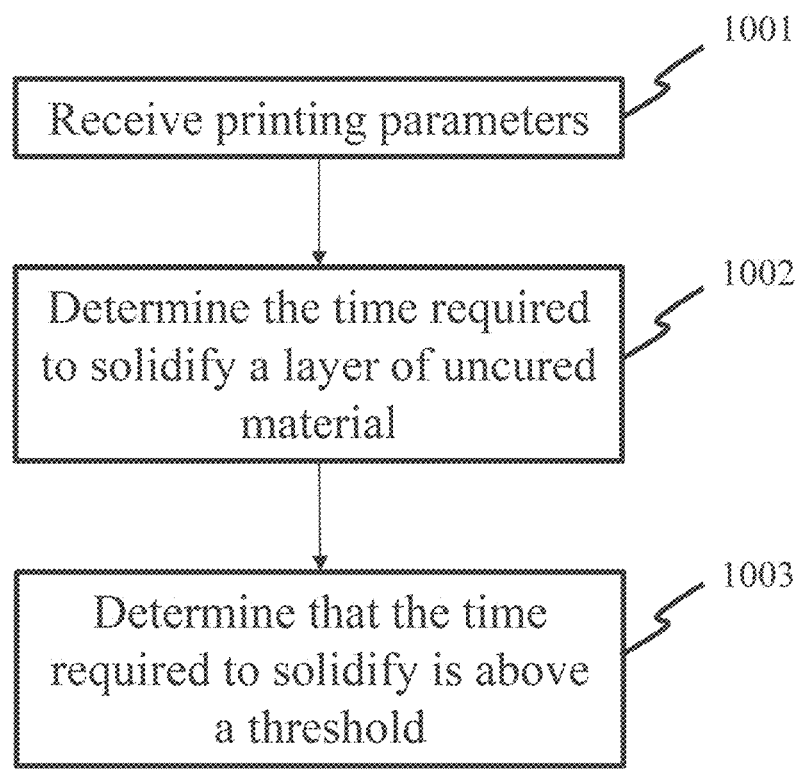
FIG. 10 is a flowchart of an embodiment of a method of determining that at least one layer of uncured material could be deformed by the wind, in accordance with an embodiment of the disclosure.

FIG. 10 is a flowchart of an embodiment of a method of determining that at least one layer of material could be deformed by the wind, in accordance with an embodiment of the disclosure. As shown in FIG. 10, a method of determining that at least one layer of uncured material could be deformed by the wind can include, at step 1001, receiving printing parameters. In some embodiments, the printing parameters can include the type of uncured material, the speed of printing, layer width, layer height, extrusion rate, and extrusion temperature. At step 1002, the method can include determining the time required to solidify a layer of uncured material. In some embodiments, determining the time required to solidify is based at least in part on the type of the uncured material and the speed of printing. In some embodiments, determining the time required to solidify can be based at least in part on environmental factors affecting the material, such as environmental temperature, humidity, and wind speed. At step 1003, the method can include determining that the time required to solidify is above a threshold such that the at least one layer of uncured material could be deformed before it solidifies.

In some embodiments, a method of determining that at least one layer of uncured material could be deformed by the wind can also include considering environmental factors such as humidity, temperature, barometric pressure. The system can further include sensors and sensor arrays configured to measure these factors.

Figure 11:
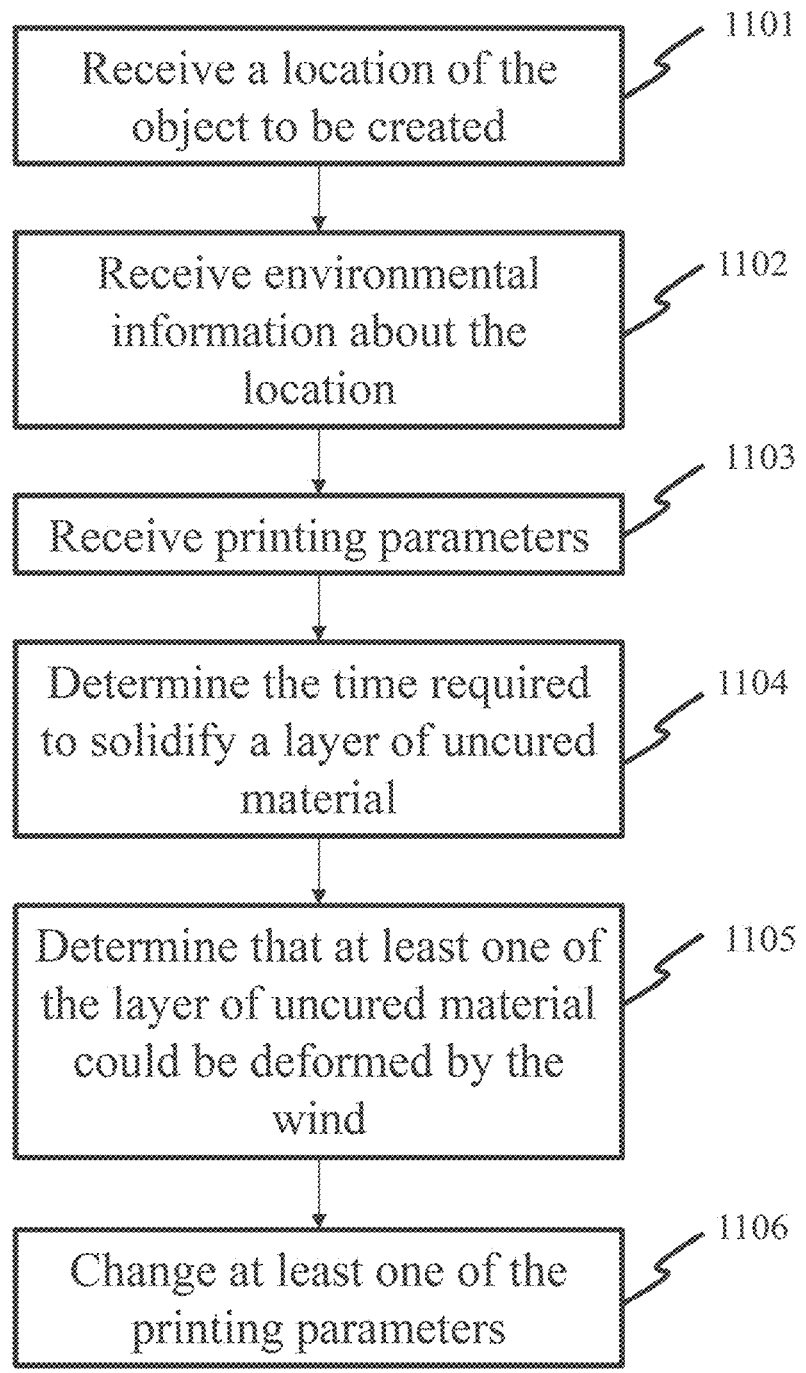
FIG. 11 is a flowchart of an embodiment of a method of creating an object using additive manufacturing, in accordance with an embodiment of the disclosure.

FIG. 11 is a flowchart of an embodiment of a method of creating an object using additive manufacturing, in accordance with an embodiment of the disclosure. As shown in FIG. 11, a method of creating an object using additive manufacturing can include, at step 1101, receiving a location of an object to be created. At step 1102, the method can include receiving environmental information about the location. At step 1103, the method can include receiving printing parameters. At step 1104, the method can include determining the time required to solidify a layer of uncured material. At step 1105, the method can include determining that at least one layer of uncured material could be deformed by the wind. At step 1106, the method can include changing at least one of the printing parameters to reduce the time for the uncured material to solidify. In some embodiments, changing at least one of the printing parameters can include changing the speed of printing. In some embodiments, changing at least one of the printing parameters can include modulating the composition of the material 32.

Certain materials, namely concrete, have properties that can be affected by environmental conditions such as humidity and temperature. The printing device 10 can be configured to modulate a composition of the material 32, for example by changing the ratio of water to cement in a concrete mixture, which can mitigate deformation. Increasing the ratio of cement to water in a concrete mixture would make the material 32 comprising the concrete mixture less susceptible to deformation.

In some embodiments, changing at least one of the printing parameters can include decreasing an amount of water or other additives added to a concrete mixture to reduce the slump and/or curing time of the uncured concrete in response to the processor determining that at least one of the successive layers of uncured material 32 could be deformed by the wind 40. In other examples, the printing device 10 can be configured to reduce an extrusion temperature of a thermoplastic material so that cooling and hardening of the thermoplastic material takes less time. Adjusting these properties can be done in conjunction with adjusting printing parameters such as printing speed, layer height, and others as disclosed herein.

Figure 12:
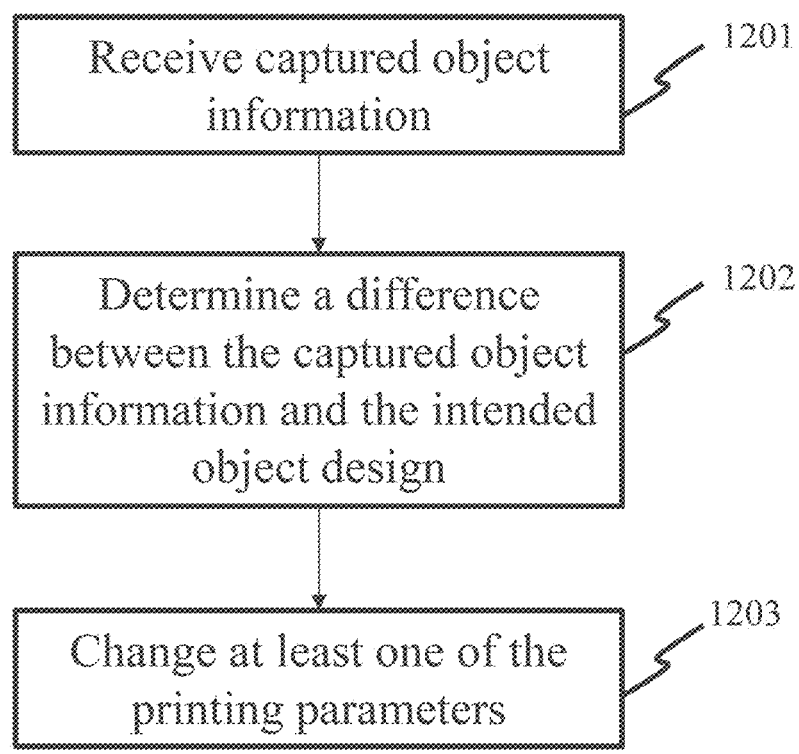
FIG. 12 is a flowchart of an embodiment of a method of creating an object using additive manufacturing, in accordance with an embodiment of the disclosure.

FIG. 12 is a flowchart of an embodiment of a method of creating an object using additive manufacturing, in accordance with an embodiment of the disclosure. As shown in FIG. 12, a method of creating an object using additive manufacturing can include, at step 1201, receiving captured object information. For example, in some embodiments, the captured object information can be a geometry of the object, a surface texture of the object, a layer height of the object, and a degree of solidification of the material. In some embodiments, the captured object information can be captured from the recording device 25. At step 1202, the method can include determining a difference between the captured object information and the intended object design. At step 1203, the method can include changing at least one of the printing parameters. In some embodiments, changing at least one of the printing parameters can include changing the path of the printing.

Figure 13:
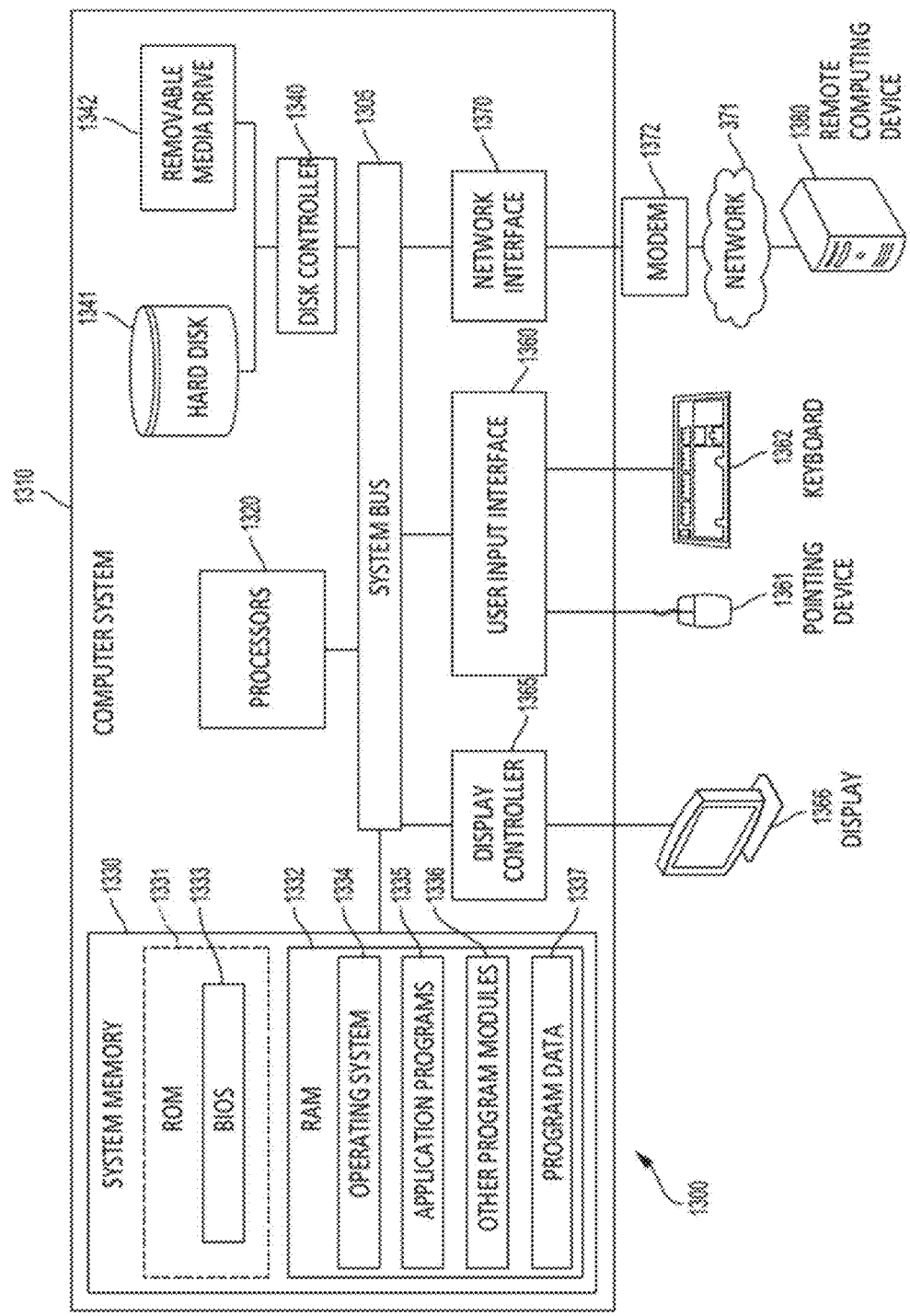
FIG. 13 illustrates an exemplary computing environment 1300 within which embodiments of the disclosure may be implemented.

FIG. 13 illustrates an exemplary computing environment 1300 within which embodiments of the disclosure may be implemented. For example, this computing environment 1300 may be configured to execute a method of creating an object using additive manufacturing. The computing environment 1300 may include computer system 1310, which is one example of a computing system upon which embodiments of the invention may be implemented. Computers and computing environments, such as computer system 1310 and computing environment 1300, are known to those of skill in the art and thus are described briefly here.

As shown in FIG. 13, the computer system 1310 may include a communication mechanism such as a bus 1305 or other communication mechanism for communicating information within the computer system 1310. The computer system 1310 further includes one or more processors 1320 coupled with the bus 1305 for processing the information. The processors 1320 may include one or more central processing units (CPUs), graphical processing units (GPUs), or any other processor known in the art.

The computer system 1310 also includes a system memory 1330 coupled to the bus 1305 for storing information and instructions to be executed by processors 1320. The system memory 1330 may include computer readable storage media in the form of volatile and/or nonvolatile memory, such as read only memory (ROM) 1331 and/or random access memory (RAM) 1332. The system memory RAM 1332 may include other dynamic storage device(s) (e.g., dynamic RAM, static RAM, and synchronous DRAM). The system memory ROM 1331 may include other static storage device(s) (e.g., programmable ROM, erasable PROM, and electrically erasable PROM). In addition, the system memory 1330 may be used for storing temporary variables or other intermediate information during the execution of instructions by the processors 1320. A basic input/output system (BIOS) 1333 containing the basic routines that help to transfer information between elements within computer system 1310, such as during start-up, may be stored in ROM 1331. RAM 1332 may contain data and/or program modules that are immediately accessible to and/or presently being operated on by the processors 1320. System memory 1330 may additionally include, for example, operating system 1334, application programs 1335, other program modules 1336 and program data 1337.

The computer system 1310 also includes a disk controller 1340 coupled to the bus 1305 to control one or more storage devices for storing information and instructions, such as a hard disk 1341 and a removable media drive 1342 (e.g., floppy disk drive, compact disc drive, tape drive, and/or solid state drive). The storage devices may be added to the computer system 1310 using an appropriate device interface (e.g., a small computer system interface (SCSI), integrated device electronics (IDE), Universal Serial Bus (USB), or FireWire).

The computer system 1310 may also include a display controller 1365 coupled to the bus 1305 to control a display 1366, such as a cathode ray tube (CRT) or liquid crystal display (LCD), for displaying information to a computer user. The computer system 1310 includes an input interface 1360 and one or more input devices, such as a keyboard 1362 and a pointing device 1361, for interacting with a computer user and providing information to the processor 1320. The pointing device 1361, for example, may be a mouse, a trackball, or a pointing stick for communicating direction information and command selections to the processor 1320 and for controlling cursor movement on the display 1366. The display 1366 may provide a touch screen interface which allows input to supplement or replace the communication of direction information and command selections by the pointing device 1361.

The computer system 1310 may perform a portion or all of the processing steps of embodiments of the invention in response to the processors 1320 executing one or more sequences of one or more instructions contained in a memory, such as the system memory 1330. Such instructions may be read into the system memory 1330 from another computer readable medium, such as a hard disk 1341 or a removable media drive 1342. The hard disk 1341 may contain one or more datastores and data files used by embodiments of the present invention. Datastore contents and data files may be encrypted to improve security. The processors 1320 may also be employed in a multi-processing arrangement to execute the one or more sequences of instructions contained in system memory 1330. In alternative embodiments, hard-wired circuitry may be used in place of or in combination with software instructions. Thus, embodiments are not limited to any specific combination of hardware circuitry and software.

As stated above, the computer system 1310 may include at least one computer readable medium or memory for holding instructions programmed according to embodiments of the invention and for containing data structures, tables, records, or other data described herein. The term "computer readable medium" as used herein refers to any medium that participates in providing instructions to the processor 1320 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 1341 or removable media drive 1342. Non-limiting examples of volatile media include dynamic memory, such as system memory 1330. Non-limiting examples of transmission media include coaxial cables, copper wire, and fiber optics, including the wires that make up the bus 1305. Transmission media may also take the form of acoustic or light waves, such as those generated during radio wave and infrared data communications.

The computing environment 1300 may further include the computer system 1310 operating in a networked environment using logical connections to one or more remote computers, such as remote computer 1380. Remote computer 1380 may be a personal computer (laptop or desktop), a mobile device, a server, a router, a network PC, a peer device or other common network node, and typically includes many or all of the elements described above relative to computer system 1310. When used in a networking environment, computer system 1310 may include modem 1372 for establishing communications over a network 1371, such as the Internet. Modem 1372 may be connected to bus 1305 via user network interface 1370, or via another appropriate mechanism.

Network 1371 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 1310 and other computers (e.g., remote computer 1380). The network 1371 may be wired, wireless or a combination thereof. Wired connections may be implemented using Ethernet, Universal Serial Bus (USB), RJ-11 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 1371.

The embodiments of the present disclosure may be implemented with any combination of hardware and software. In addition, the embodiments of the present disclosure may be included in an article of manufacture (e.g., one or more computer program products) having, for example, computer-readable, non-transitory media. The media has embodied therein, for instance, computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive," or it may mean "one,"

it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

The term "about" or "approximately" or "substantially" means within an acceptable error range for the particular value as determined by one of ordinary skill in the art, which will depend in part on how the value is measured or determined, i.e., the limitations of the measurement system. For example, "about" can mean within an acceptable standard deviation, per the practice in the art. Alternatively, "about" can mean a range of up to ±20%, preferably up to ±10%, more preferably up to ±5%, and more preferably still up to ±1% of a given value. Alternatively, the term can mean within an order of magnitude, preferably within 2-fold, of a value. Where particular values are described in the application and claims, unless otherwise stated, the term "about" is implicit and in this context means within an acceptable error range for the particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another.

It is noted that terms like "specifically," "preferably," "typically," "generally," and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way.

What is claimed is:

1. A method of creating an object while preventing deformation, the method comprising:
    depositing successive layers of uncured material;
    responsive to determining that a wind speed at the successive layers of uncured material exceeds a threshold, mitigating a deformation of at least one of the successive layers of uncured material, wherein mitigating the deformation comprises physically supporting at least one of the successive layers of uncured material and shielding the at least one of the successive layers of uncured material from the wind when the wind speed exceeds the threshold.

2. The method of claim 1, further comprising physically coupling at least one of a plurality of devices with at least one other of the plurality of devices to stabilize the plurality of devices, wherein the at least one of a plurality of devices and the at least one other of the plurality of devices are configured to physically support at least one of the successive layers of uncured material.

3. The method of claim 1, further comprising:
receiving a location of the object;
receiving environmental information about the location, wherein the environmental information comprises a wind direction and the wind speed,
wherein the determining is based at least in part on the received environmental information.

4. The method of claim 3, further comprising:
determining that at least one of the successive layers of uncured material could be deformed by the wind by:
  receiving a plurality of printing parameters, wherein the plurality of printing parameters comprises a type of the uncured material and a speed of printing;
  determining a time required to solidify at least one of the successive layers of uncured material based at least in part on the type of the uncured material and the speed of printing; and
  determining that the time required to solidify is above a threshold such that at least one of the successive layers of uncured material that could be deformed by the wind based at least in part on the environmental information; and
shielding the at least one of the successive layers of uncured material that could be deformed from the wind.

5. The method of claim 3, further comprising:
determining that at least one of the successive layers of uncured material could be deformed by the wind by:
  receiving a plurality of printing parameters, wherein the plurality of printing parameters comprises a type of the uncured material and a speed of printing;
  determining a time required to solidify at least one of the successive layers of uncured material based at least in part on the type of the uncured material and the speed of printing; and
  determining at least one of the successive layers of uncured material that could be deformed by the wind based at least in part on the environmental information, wherein mitigating the deformation comprises changing the speed of printing in response to the determination that at least one of the successive layers of uncured material that could be deformed by the wind based at least in part on the environmental information.

* * * * *